United States Patent Office 3,376,317
Patented Apr. 2, 1968

3,376,317
2-ETHYLPYROMECONIC ACID AS AROMA AND FLAVOR COMPONENT
Charles R. Stephens, Jr., East Lyme, and Robert P. Allingham, Groton, Conn., assignors to Chas. Pfizer & Co., Inc., New York, N.Y., a corporation of Delaware
No Drawing. Continuation-in-part of application Ser. No. 310,919, Sept. 23, 1963. This application Apr. 14, 1967, Ser. No. 630,818
1 Claim. (Cl. 260—345.9)

ABSTRACT OF THE DISCLOSURE 2-ethylpyromeconic acid and its use in improving the flavor and aroma of edibles and the aroma of perfumes.

---

This application is a continuation-in-part of copending application Ser. No. 310,919 filed Sept. 23, 1963 and now abandoned.

BACKGROUND OF THE INVENTION

This invention relates to providing improved flavor and aroma in edibles and improved aroma in perfumes. More particularly, it is concerned with processes for the improvement of flavor and aroma of foods and beverages and the aroma of perfumes which comprise the addition of 2-ethylpyromeconic acid thereto. In addition, it contemplates compositions of edibles and of perfumes which contain the said 2-ethylpyromeconic acid.

2-ethylpyromeconic acid is a gamma-pyrone of the formula:

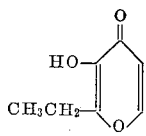

It is an acidic substance which forms salts with bases, which salts can be used interchangeably with the free acid in the instant invention.

It is a matter of common knowledge and experience that the addition of maltol, also known as 2-methylpyromeconic acid, a valuable gamma-pyrone, to many foods improves the flavor and aroma thereof to such an extent that wide consumer acceptance of the practice has been obtained. This appreciation of improved flavor is reflected in increased sales volume of foods so treated. Furthermore, numerous taste panel tests demonstrate that many foods containing maltol are preferred over those from which it is omitted. This acceptance has been found, for example, in edibles such as beverages, confections, baked goods, and ice cream. Furthermore, maltol has been added to perfumes, which have their appeal heightened because of maltol's effect of enhancing the desirable aroma thereof.

Maltol is extremely beneficial in the replacement of certain other classical flavor and aroma enhancers in that it is generally much more powerful and, for this reason, can be used in lower amounts. An advantage in this practice is immediately obvious in that such a high strength enhancer may be used at lower levels and, as a result, the natural taste of maltol itself does not overpower the desired edible flavor and aroma or perfume aroma. For example, it is known that maltol can replace four times its weight of coumarin. Although coumarin has been used very widely in the past, it has such a powerful aroma of its own, resembling that of vanilla beans, that great care must be used to prevent so much being added as to overpower the compositions, maltol, on the other hand, is used in smaller amounts than coumarin, thus providing a margin of safety. Because of this and its lack of toxicity, maltol has replaced coumarin in many foods.

It has now been found that the compound 2-ethylpyromeconic acid, surprisingly, is very much more effective than maltol as a flavor and aroma enhancer. In fact, 2-ethylpyromeconic acid has an aroma and flavor-enhancing power of about 6 times that of maltol. Thus, on a relative basis, one part by weight of 2-ethylpyromeconic acid is equivalent to about 24 parts of the aforesaid coumarin in its flavor and aroma enhancing effect.

The advantage in using 2-ethylpyromeconic acid becomes immediately obvious after considering that the relative costs of the said 2-ethylpyromeconic acid and of maltol are of approximately the same order of magnitude. Thus, the consumer is able to use only about one-sixth as much of the 2-ethylpyromeconic acid to achieve the same level of flavor and odor enhancement and realizes very significant savings in manufacturing cost. Furthermore, because of its effectiveness at such low concentrations, effects not possible to achieve with maltol are observed with 2-ethylpyromeconic acid.

It is, therefore, an object of the instant invention to provide means of enhancing the flavor and aroma of edibles and the aroma of perfume, said means being achieved with a substantial decrease in cost as compared with commonly employed means.

It is a further object of the instant invention to provide edible compositions with enhanced flavor and aroma, said compositions being obtained at substantially less cost than those of the prior art.

It is a further object of the instant invention to provide perfume compositions, said compositions having enhanced aroma and being obtained at substantial cost savings over perfume compositions of the prior art.

It is a still further object of the instant invention to provide means for enhancing the flavor and aroma of edibles and the aroma of perfumes, said means not contributing any appreciable, undesirable flavor and aroma of its own to the edibles and perfumes.

These and other objects of the instant invention are readily achieved through use of the process of this invention which, in essence, comprises enhancing the aroma of edibles and perfumes and the flavor of edibles by adding 2-ethylpyromeconic acid thereto.

With respect to enhancing the aroma and flavor of edibles, particular mention is made of the especially desirable increase in appeal which is obtained when 2-ethylpyromeconic acid is added in an amount to provide from about 1 to about 100 parts per million by weight. It is observed that below about 1 part per million there is a tendency for some of the test subjects to have difficulty in discerning the beneficial effect of the addition and that above about 100 p.p.m. some of the subjects begin to notice an aroma effect contributed by the 2-ethylpyromeconic acid itself. It is obvious to those skilled in the art to which this subject matter pertains that for varying purposes varying amounts are required, which may be determined by experimentation. Thus, in some products the test subjects have difficulty in discerning 5 p.p.m. and also in some products less desirable effects are observed above about 100 p.p.m. With respect to enhancing the aroma of perfumes, generally, the same levels of 2-ethylpyromeconic acid, as in food, can be employed. As will be understood by those skilled in the art, the precise amount of 2-ethylpyromeconic acid to be added will depend on the desired strength of the perfume odor itself. It is found especially convenient to substitute about ⅙ part by weight of 2-ethylpyromeconic acid for each 1 part by weight of maltol in those formulations where maltol is a component. Since, at the present time, maltol costs about $12 per pound; substantial savings may be obtained through the substitution of 2-ethylpyromeconic acid for maltol.

2-ethylpyromeconic acid is a novel gamma-pyrone which is readily prepared by a process which is the subject of a copending application, Ser. No. 310,141, filed Sept. 19, 1963 and now abandoned, by B. E. Tate and R. P. Allingham and assigned to the assignee of the instant invention. As is disclosed in said copending application, 2-ethylpyromeconic acid is prepared readily and economically by a combination of a fermentation technique and organic synthesis. The starting material for the said synthesis in kojic acid and the process generally comprises the steps of oxidizing kojic acid to comenic acid, of decarboxylating said comenic acid to pyromeconic acid, of treating said pyromeconic acid with acetaldehyde to form 2-(1-hydroxy)ethylpyromeconic acid, and reducing this to 2-ethylpyromeconic acid.

With respect to the term "edibles," used herein and in the appended claim, it is contemplated to include compositions which are ordinarily eaten or drunk. For example, 2-ethylpyromeconic acid is a powerful flavor and aroma enhancer for chocolate and vanilla products, candies, cake mixes, cookies, pies, desserts, fruit juices, wines, liqueurs and flavor extracts. Furthermore, it can be used as a flavor and aroma component in canned and frozen fruits and vegetables, meat and fish products, cereals, macaroni and noodle products, soups, sauces and seasonings, prepared dressings, and breads. In addition, among the edibles which can be benefitted by the process of the instant invention are pharmaceutical oral dosage forms, animal feeds and pet foods. With respect to the term "perfumes," as used herein and in the appended claims it is meant to contemplate concentrated essences, colognes, and industrial odorants which are commonly used in cosmetic and hygienic products, such as detergents and soaps, and in the perfuming of tobacco, paper, textiles, printing inks, food packages, paints, home deodorants and insecticides.

As has been mentioned hereinbefore, 2-ethylpyromeconic acid at a very low level strengthens the flavor and aroma of a wide variety of products. It develops inherent flavors and creates, especially in sweet foods, a "velvet mouth sensation." Because it so strongly augments many inherent flavors, as for instance, that of chocolate, product reformulation may be required in some instances to achieve optimum taste; these reformulations are well within the capability of those skilled in the art. 2-ethylpyromeconic acid may be added to the food or perfume directly in the dry form or, alternatively, as a solution. Care should be taken to obtain even distribution through the use of pre-mixing if necessary, since such small quantities have such a powerful effect.

The following specific examples illustrate the practice of the invention, but are not to be construed as limiting the invention to the foods specifically disclosed.

EXAMPLE I

Aqueous solutions of 2-ethylpyromeconic acid and of maltol are serially diluted and matched as to odor intensity. It is found that 2-methylpyromeconic acid has an aroma 6 times as strong as that of maltol. Furthermore, this effect is noticed at a considerably lower concentration than that previously recorded for maltol.

EXAMPLE II 2-ethylpyromeconic acid is added to chocolate bars by melting the bars and incorporating into one sample 20 p.p.m. and into another 40 p.p.m. The bars are recast and tasted and compared with chocolate to which no 2-ethylpyromeconic acid has been added. It is found that the 2-ethylpyromeconic acid increases the richness of the chocolate flavor and creates a blended taste by evening off harsh chocolate notes and lifting the aroma, as compared with the control.

EXAMPLE III 2-ethylpyromeconic acid is added to a commercial yellow cake mix at 4, 13, 25, 41, 80 and 100 p.p.m., based on dry weight. The cakes are prepared according to label directions. There is also prepared a control cake, which does not contain 2-ethylpyromeconic acid. 2-ethylpyromeconic acid added at 13 p.p.m. appears to give the best enhancement of aroma and flavor. For all the cakes, those containing 2-ethylpyromeconic acid are superior to control.

Commercial angel food cake mix is given an increased taste appeal by the addition of 40 p.p.m. of 2-ethylpyromeconic acid. Since the flavor of presently available angel food cake mixes is rather bland, the addition of 2-ethylpyromeconic acid provides a means for improving this product.

A pineapple cake mix is similarly tested with 40 p.p.m. of 2-ethylpyromeconic acid and is more attractive in flavor and aroma than the control.

A coconut macaroon mix containing 40 p.p.m. of 2-ethylpyromeconic acid is baked yielding a richer-tasting cookie with a stronger coconut flavor and smoother mouth feel than the control. During mixing, the coconut aroma is more evident in the cookie mixture containing the 2-ethylpyromeconic acid.

EXAMPLE IV

A chocolate fudge is prepared containing 2-ethylpyromeconic acid and is compared with a control; the basic creme fondant is prepared containing 40 p.p.m. of 2-ethylpyromeconic acid. The 2-ethylpyromeconic acid strongly reinforces the chocolate flavor and the product is judged to have a more pleasant fragrance.

Creme candies are prepared containing 20 p.p.m. of 2-ethylpyromeconic acid; they are found to have significantly better flavors than those which do not contain the said acid.

EXAMPLE V

Pineapple juice flavor is pleasantly enhanced when 2-ethylpyromeconic acid is added at 4 p.p.m., and compared with a control.

Ten p.p.m. of 2-ethylpyromeconic acid added to grape juice greatly amplifies the natural sweet grape aroma.

Five p.p.m. of 2-ethylpyromeconic acid in sherry wine provides an improved flavor; 10 p.p.m. of 2-ethylpyromeconic acid creates a pleasant change in bouquet.

The flavor of an orange-type liqueur is sweetened by the addition of 10 p.p.m. of 2-ethylpyromeconic acid to said liqueur.

The fruit flavor of a low calorie orange drink is enhanced by adding 1 p.p.m. of 2-ethylpyromeconic acid thereto.

EXAMPLE VI 2-ethylpyromeconic acid is dissolved in a floral base cologne to provide 4, 8, 10, 25, 50, 75, 100 and 250 p.p.m., respectively. The odors of the resulting perfume compositions are determined and compared with that of the untreated perfume as a control. The aromas of the 2-ethylpyromeconic acid-containing perfumes are significantly enhanced.

EXAMPLE VII 2-ethylpyromeconic acid alone is added to a perfume base solvent at 10 p.p.m. When this is sprayed into an area it provides a pleasant cotton-candy like aroma.

EXAMPLE VIII

Ethyl maltol, propyl maltol and maltol were evaluated as to their taste and odor characteristics by a professional flavor chemist having nine years experience in food and perfume chemistry.

Protocol.—Three solutions were prepared containing respectively 100 p.p.m. of maltol (2-methylpyromeconic acid), ethyl maltol (2-ethylpyromeconic acid), and propyl maltol (2-propylpyromeconic acid) in 25% ethanol-water. Each solution was further diluted with water to levels of 500, 200, 100 and 10 p.p.m. Each of the twelve samples was evaluated as to odor and odor intensity.

Conclusion.—The flavor chemist concluded that (1) the sample containing 500 p.p.m. maltol had about the same level of odor intensity as the sample with 100 p.p.m. ethyl maltol. (2) The sample containing 10 p.p.m. ethyl maltol had an odor intensity stronger than the sample containing 100 p.p.m. propyl maltol but less intense than the sample containing 100 p.p.m. maltol. (3) Ethyl maltol-containing samples had an odor character similar to maltol but more intense, sweeter and more desirable than the odor of maltol.

EXAMPLE IX

The flavor chemist of Example VIII evaluated ethyl maltol, propyl maltol and maltol as to their flavor and odor intensities when contained in a strawberry beverage.

Protocol.—A strawberry beverage was prepared according to the following formulation:

| Strawberry beverage: | Percent |
|---|---|
| Sugar | 8.40 |
| Citric acid | 0.14 |
| Water | 91.21 |
| Strawberry flavor | 0.25 |
| | 100.00 |

| Strawberry flavor: | Grams |
|---|---|
| Vanillin | 0.10 |
| Ethyl butyrate | 0.35 |
| EMPG [1] | 1.00 |
| Strawberry coeur | 0.50 |
| Ethyl alcohol | 98.05 |
| | 100.00 |

[1] Ethyl methyl phenyl glycidate.

To four 200-gram samples of the strawberry beverage were added, respectively, 100 p.p.m. maltol (A), 20 p.p.m. ethyl maltol (B), 100 p.p.m. propyl maltol (C), and 500 p.p.m. propyl maltol (D). A fifth 200-gram sample was used as a control beverage (E) i.e., it contained no maltol of maltol analog. The samples were tested by the flavor chemist.

Results.—The flavor chemist indicated the following samples were of the odor and flavor intensities indicated:

Sample A stronger than C
Sample A stronger than E
Sample B equal to A
Sample B stronger than C
Sample B stronger than E
Sample C equal to E
Sample D has a predominant off taste Conclusion.—The flavor chemist concluded from the results of his tests that (1) The two beverage samples containing 20 p.p.m. ethyl maltol and 100 p.p.m. maltol, respectively, proved to have an outstanding strawberry flavor, superior in strength to the control beverage and to the beverage containing 100 p.p.m. propyl maltol.

(2) The strawberry beverage containing 20 p.p.m. of ethyl maltol had a strawberry flavor equally as intense as the strawberry beverage containing 100 p.p.m. maltol.

(3) A beverage containing 100 p.p.m. propyl maltol proved to have a comparable taste to the control beverage and thus showed no advantageous effect.

(4) A beverage containing 500 p.p.m. propyl maltol was found to have a predominant off taste and thus to have an undesirable effect.

EXAMPLE X

A strawberry beverage was prepared according to the formulation of Example IX. The control beverage was divided into three parts. To one part was added ethyl maltol in an amount to give a 20 p.p.m. concentration in the beverage. To the second part was added maltol in an amount to give 20 p.p.m. concentration in the beverage. The third part was used as a control and contained no maltol or ethyl maltol.

Each sample was compared by the flavor chemist of Example VIII. He concluded that sample containing 20 p.p.m. ethyl maltol had a stronger, more intense and more natural taste than did the sample containing 20 p.p.m. malto. The control sample had a taste, less intense than the samples containing either 20 p.p.m. of ethyl maltol or 20 p.p.m. of maltol.

EXAMPLE XI

Two taste panels of specially selected members each of whom had previously shown a particular sensitivity to variations in the taste and aroma of foods, were brought together for the purpose of comparing the effect of maltol, ethyl maltol and propyl maltol in foods.

Part A.—A triangle panel evaluation of maltol and with propyl maltol was conducted using five judges who had each previously participated in similar test programs and who were familiar with the psychophysical procedure of sensory panel evaluations.

Protocol.—Each panel member was given three samples, designated No. 1, No. 2 and No. 3, and asked to taste each and determine which was the odd sample and which two were alike, and to state his preference of the three samples.

Test samples.—The strawberry beverage control prepared according to the formulation of Example IX was used. To samples No. 1 and No. 3 of the control beverage were added sufficient propyl maltol to give 100 p.p.m. of propyl maltol. To sample No. 2 was added maltol in an amount to give 100 p.p.m.

RESULTS

| Taster | A | B | C | D | E |
|---|---|---|---|---|---|
| First Preference | 1, 3 | 2 | 2 | 2 | 1 |
| Second Preference | 2 | 1, 3 | 1, 3 | 1, 3 | 2, 3 |
| Like Samples | 1, 3 | 1, 3 | 1, 3 | 1, 3 | 2, 3 |
| Odd Sample | 2 | 2 | 2 | 2 | 1 |

Descriptive phrases used by the tasters for the samples:

Propyl maltol sample:
 "not as sweet"
 "slightly bitter"
 "more flat"
 "not fruity"
Maltol sample:
 "more sweet"
 "more fruity"
 "more pronounced strawberry flavor"

Conclusion.—Four out of five tasters selected the odd sample correctly. Three of these four tasters preferred the taste of the sample containing maltol to the sample containing an equal amount of propyl maltol.

Part B.—A skilled and well-qualified taste panel of seven members was brought together. Each member was experienced in testing the flavor and aromas of foods, food additives and flavor and aroma enhancers. The panel was asked to select the more flavorful of two blind samples of a strawberry gelatin dessert. An eighth panel member was asked to participate during the latter part of the testing.

Protocol.—Flavor testing was conducted over a period of five days in a specially constructed flavor panel room provided with red lights to prevent the panelists from discerning the color of the samples. Each panelist's booth was individually partitioned. The testing room was air-conditioned and free from noise and distractions. A period of about three hours was allowed between the time an individual panelist made one judgment regarding a pair of samples and his next judgement on another pair of samples. Drinking water and a bland cracker were available for each panelist, in the event he believed he could still taste the first sample before tasting the second sample of a pair. Each pair of samples consisted of a sample containing maltol and a sample containing ethyl maltol. The samples were randomized in the sense that during any one testing period, half the panelists were given the maltol sample first and half were given the ethyl maltol sample first. Panelists were asked to mark their preference on a ballot.

Test samples

Control.—To 85 grams of a strawberry-flavored gelatin dessert powder base was added 30 mg. of maltol. The powder mixture was stirred and blended with 1 pint hot water and allowed to cool and gel. The strawberry-flavored gelatin dessert powder base was a commercial formulation containing only sugar, strawberry flavor and gelatin.

Samples.—Samples of strawberry-flavored gelatin dessert containing ethyl maltol were prepared by adding varying amounts of ethyl maltol to 85 gram lots of the strawberry-flavored gelatin dessert powder base. One pint of hot water was added to each sample and the samples were allowed to cool and gel.

Formulation:
- Strawberry-flavored gelatin dessert powder base _____ grams__ 85
- Water _____ pint__ 1
- Additive, as indicated below.

| Sample (No.) | Additive | Amount (mg.) | Ethyl Maltol Level [1] |
|---|---|---|---|
| 1 | Maltol | 30 | 0 |
| 2 | Ethyl maltol | 15 | 1/2 |
| 3 | do | 10 | 1/3 |
| 4 | do | 7.5 | 1/4 |
| 5 | do | 6.0 | 1/5 |
| 6 | do | 5.0 | 1/6 |
| 7 | do | 4.3 | 1/7 |
| 8 | do | 3.8 | 1/8 |
| 9 | do | 3.3 | 1/9 |
| 10 | do | 3.0 | 1/10 |

[1] Level of ethyl maltol in sample compared to level of maltol in sample 1.

Summary of results

| Level of ethyl maltol as compared to maltol level: | Number of panelists preferring ethyl maltol sample |
|---|---|
| 1/2 | 7–7 |
| 1/3 | 6–7 |
| 1/4 | 7–7 |
| 1/5 | 6–7 |
| 1/6 | 4–7 |
| 1/7 | 4–7 |
| 1/8 | 0–8 |
| 1/9 | 1–8 |
| 1/10 | 1–8 |

Conclusion.—Maltol, when added to a strawberry-flavored gelatin dessert, gives a less flavorful product than does a gelatin dessert to which is added ethyl maltol at levels of from 1/2 down to about 1/5 those of maltol in the maltol-containing dessert.

What is claimed is:

1. 2-ethylpyromeconic acid.

References Cited

UNITED STATES PATENTS 3,130,204   4/1964   Tate et al. _____ 260—345.9

OTHER REFERENCES

Index Chemicus, volume 6, No. 5, Issue 53, p. 16 (21189), Sept. 15, 1962.

Kingston, Manufacturing Chemist, volume 33, No. 5, May 1962, pp. 193–195.

NORMA S. MILESTONE, *Primary Examiner.*